(12) United States Patent
Jin

(10) Patent No.: US 7,466,702 B2
(45) Date of Patent: Dec. 16, 2008

(54) METHOD AND DEVICE FOR WORKING MODE SWITCHING OF MEDIA STREAM TRANSITION CHANNEL ON GATEWAY

(75) Inventor: Tong Jin, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 11/518,760

(22) Filed: Sep. 11, 2006

(65) Prior Publication Data

US 2007/0053371 A1 Mar. 8, 2007

Related U.S. Application Data

(63) Continuation of application No. PCT/CN2005/001213, filed on Aug. 8, 2005.

(30) Foreign Application Priority Data

Aug. 6, 2004 (CN) .................. 2004 1 0055460

(51) Int. Cl.
*H04L 12/28* (2006.01)
*H04L 12/56* (2006.01)
*H04L 12/66* (2006.01)

(52) U.S. Cl. ....................... 370/389; 370/352

(58) Field of Classification Search ............... None
See application file for complete search history.

(56) References Cited

U.S. PATENT DOCUMENTS

| | | | |
|---|---|---|---|
| 6,486,975 B1 | 11/2002 | Verreault et al. | |
| 6,967,946 B1 * | 11/2005 | Tackin et al. | 370/352 |
| 7,057,755 B2 | 6/2006 | Yoshida | |
| 7,075,979 B2 * | 7/2006 | Beadle et al. | 375/222 |
| 7,126,711 B2 * | 10/2006 | Fruth | 358/1.15 |
| 7,180,892 B1 * | 2/2007 | Tackin | 370/389 |
| 2002/0051173 A1 | 5/2002 | Yoshida | |
| 2002/0164002 A1 | 11/2002 | Beadle et al. | |
| 2003/0123097 A1 | 7/2003 | Fruth | |
| 2004/0021894 A1 | 2/2004 | Mundra | |
| 2004/0184110 A1 | 9/2004 | Maei et al. | |
| 2004/0190499 A1 | 9/2004 | Chen et al. | |
| 2006/0285171 A1 | 12/2006 | Ma et al. | |

FOREIGN PATENT DOCUMENTS

| | | |
|---|---|---|
| EP | 1 119 182 A2 | 7/2001 |
| KR | 2003056681 A1 | 7/2003 |
| WO | WO 2004/049655 A1 | 6/2004 |
| WO | WO 2005/053232 A1 | 6/2005 |

* cited by examiner

*Primary Examiner*—Edward L Coles
*Assistant Examiner*—Marcus T Riley
(74) *Attorney, Agent, or Firm*—Leydig, Voit & Mayer, Ltd.

(57) ABSTRACT

A method and a device for switching the working mode of the media stream transition channel on a gateway. The method includes: detecting signals sent by data devices passing through the gateway, if the signals from common fax machines are detected, the media stream transition channel is switched to a T.38 mode; if the signals from high speed data devices are detected, the media stream transition channel is switched to a Voice-Band Data (VBD) mode, and at the same time, further signal detection is performed, if Call Menu-FAX (CM-FAX) signals are detected, the media stream transition channel is switched to the T.38 mode. The switching device of the invention includes a first detecting unit, a second detecting unit and a switching unit. The present invention can quickly, implement the working mode switching of the media stream transition channel on a gateway, which reduces the maintenance complexity of the devices.

13 Claims, 2 Drawing Sheets

METHOD AND DEVICE FOR WORKING MODE SWITCHING OF MEDIA STREAM TRANSITION CHANNEL ON GATEWAY

This application is a continuation of International Patent Application No. PCT/CN2005/001213, filed Aug. 8, 2005, which claims priority to Chinese Patent Application No. 200410055460.0, filed Aug. 6, 2004, all of which are hereby incorporated by reference.

FIELD OF THE TECHNOLOGY

The present invention relates to network communication techniques, and more particularly, to a method and device for working mode switching of the media stream transition channel on a gateway.

BACKGROUND OF THE INVENTION

Along with the rapid development of the network communication, multimedia information transmitted by the packet technique has already come true. The trend of combining the traditional communication technique and the packet technique is becoming more and more obvious. Because of the difference in the coding modes of the media stream transmitted in the communication networks of the traditional communication technique and that of the modern packet technique, a device called gateway is needed at the interface of the traditional network and the packet network to switch the media stream coding mode.

At present, the media stream processed by the gateway mainly includes voice stream, data stream and video stream, wherein the data stream mainly includes the signals generated in the interaction between the data devices such as modems, accessing servers, common fax machines and high speed fax machines. The existing modes used in the industry to transmit the data streams via a gateway mainly include: Voice-Band Data (VBD) mode and T.38 mode.

The VBD mode treats the data stream as a common voice stream and conducts the coding/decoding in the mode which passes voice-band modulated signals with minimal distortion. The recommendation of coding and decoding are G.711 and G.726 prescribed by International Telecommunications Union—Telecommunication Standardization Sector (ITU-T). The advantage of the mode is that it is simple to realize and there is no need to know the signification of the specific data signals.

The T.38 mode is a transmitting mode by which the facsimile messages following the ITU-T Recommendation T.30 sent by the fax machines are transformed to messages in line with ITU-T Recommendation T.38, which is suitable for IP bearer network transmission. To ensure the quality of facsimile services, gateway manufacturers are trying their best to ensure that the mode is adopted in the processes of the facsimile services.

The above two modes to transmit the data streams usually co-exist in the network, which leads to a problem of working mode switching of the media stream transition channel (Channel in short) on the gateway. The working mode switching is the switching between the working modes of the voice stream coding/decoding transition channel and the data stream transition channel according to the need of the service, and the working mode switching of the data stream transition further includes the switching between the VBD mode and the T.38 mode. The condition to trigger the switching of channel state is the detection on the channel of various special data signal sent by the data devices by the gateway. The specific principle of the switching is to try the best to switch to the T.38 mode in the processes of facsimile service, and switch to the VBD mode in the processes of non-facsimile services, for example, a data service from the modem.

It can be seen from the description above that it is very important to the successful implementation of the data services that the gateway detects the signals sent by the various data devices as soon as possible, distinguishes the signals of facsimile devices from the signals of non-facsimile devices, and switches to different data stream transmitting modes.

A typical gateway is now capable of detecting its transmitted data signals which include: a Calling Tone (CNG) which is an indication signal sent by the transmitting fax machine; a Called Terminal Identification (CED), which is an indication signal sent by the receiving fax machine; a V.21 flag which is an High Data Link Control (HDLC) frame synchronous signal for $1 s \pm 15\%$ following the ITU-T Recommendation V.21 and an amplitude-modulated answer tone (ANSam), or an amplitude-modulated answer tone with phase reversals (/ANSam) sent by the modems. It can be seen that, as long as the signals are detected exactly, it is not difficult to distinguish a common fax machine and a modem. However, along with the development of data equipment, the high speed fax machines operating at a modem speed of 33.6 kbps have emerged in the market. The negotiation process of the high speed fax machines may include sending ANSam or /ANSam signals which are similar with that from the modems such that distinguishing the high speed fax machines from the modems and then switching the gateway to the corresponding data stream transmission mode quickly has become a problem concerned by many manufacturers.

In view of the problem mentioned above, a mode at present is to decide whether a signal comes from the modem or not by analyzing the accessing number of the user. If the prefix of the user's accessing number is consistent with that preset by the gateway, the signal is considered to be from the modem, so the gateway sets up a data transmission channel directly and works in the VBD mode; otherwise, the signal is affirmed to be not from a modem, if an ANSam or /ANSam signal is detected after the voice channel is set up, the signal will be considered to be from a high speed fax machine and the gateway will switch the channel to a data channel of the T.38 mode.

Another mode at present is that the VBD mode is used by both of the high speed fax machines and the modems. That is to say, after the ANSam or /ANSam signal is detected, the channel will be switched to the VBD mode while the transmission of the signals from the high speed fax machines in the T.38 mode is abandoned.

SUMMARY OF THE INVENTION

A method and device for working mode switching of a media stream transition channel on a gateway, so that the working mode of the media stream transition channel can be switched expediently and correctly according to the media stream to be transmitted.

The technique scheme is as follows:

a method for working mode switching of the media stream transition channel on a gateway, including detecting the signal passing through the gateway, if a signal sent by a common fax machine is detected, switching the media stream transition channel to the T.38 mode, and if a signal sent by a high speed data device is detected, conducting further signal detection, if a Call Menu-FAX (CM-FAX) signal is detected, which is a Call Menu with the calling function of the high speed fax machine, switching the media stream transition channel to the T.38 mode.

A device for working mode switching of the media stream transition channel on a gateway, including a first detecting unit, a second detecting unit and a switching unit, the first detecting unit detects the signals passing through the gateway, if the signals sent by common fax machines are detected, issues to the switching unit the first switching command of the switching to the T.38 mode, and if the signals sent by high speed data devices are detected, issues to the second detecting unit the start-up command of instructing the second detecting unit to start detecting the signals passing through the gateway;

the second detecting unit detects the signals passing through the gateway when receiving the start-up command, and if a CM-FAX signal is detected, issues to the switching unit the first switching command of the switching to the T.38 mode.

the switching unit implements the corresponding switching to the T.38 mode according to the first switching command.

A method for working mode switching of a media stream transition channel on a gateway, comprising:

detecting signals passing through the gateway after a voice channel is set up;

if a signal sent by a common fax machine or a signal sent by a high speed data device is detected, switching the media stream transition channel to a Voice-Band Data (VBD) mode;

upon switching the media stream transition channel to the VBD mode, conducting a further signal detection, wherein, if the signal sent by the common fax machine is detected, switching the media stream transition channel to a T.38 mode;

if a Call Menu-FAX (CM-FAX) signal is detected, switching the media stream transition channel to the T.38 mode; and if a Call Menu-MODEM (CM-MODEM) signal is detected, maintaining the media stream transition channel in the VBD mode.

It can be seen from the technical scheme described above that, in accordance with the present invention, the types of the data devices that send signals can be identified exactly and quickly via the detection of the signals sent by such data devices, so that exact switching of the working mode of the media stream transition channel can be implemented. Therefore, the present invention is simple to implement and may reduce the maintenance complexity of the devices. Furthermore, the method provided by the present invention supports all the existing data services at the same time, including the services of accessing the Internet by dialing-up and Point-to-Point modem service implemented via the VBD mode as well as the facsimile services by the common fax machines and the high speed fax machines implemented via the T.38 mode.

EMBODIMENTS OF THE INVENTION

Figure 1:
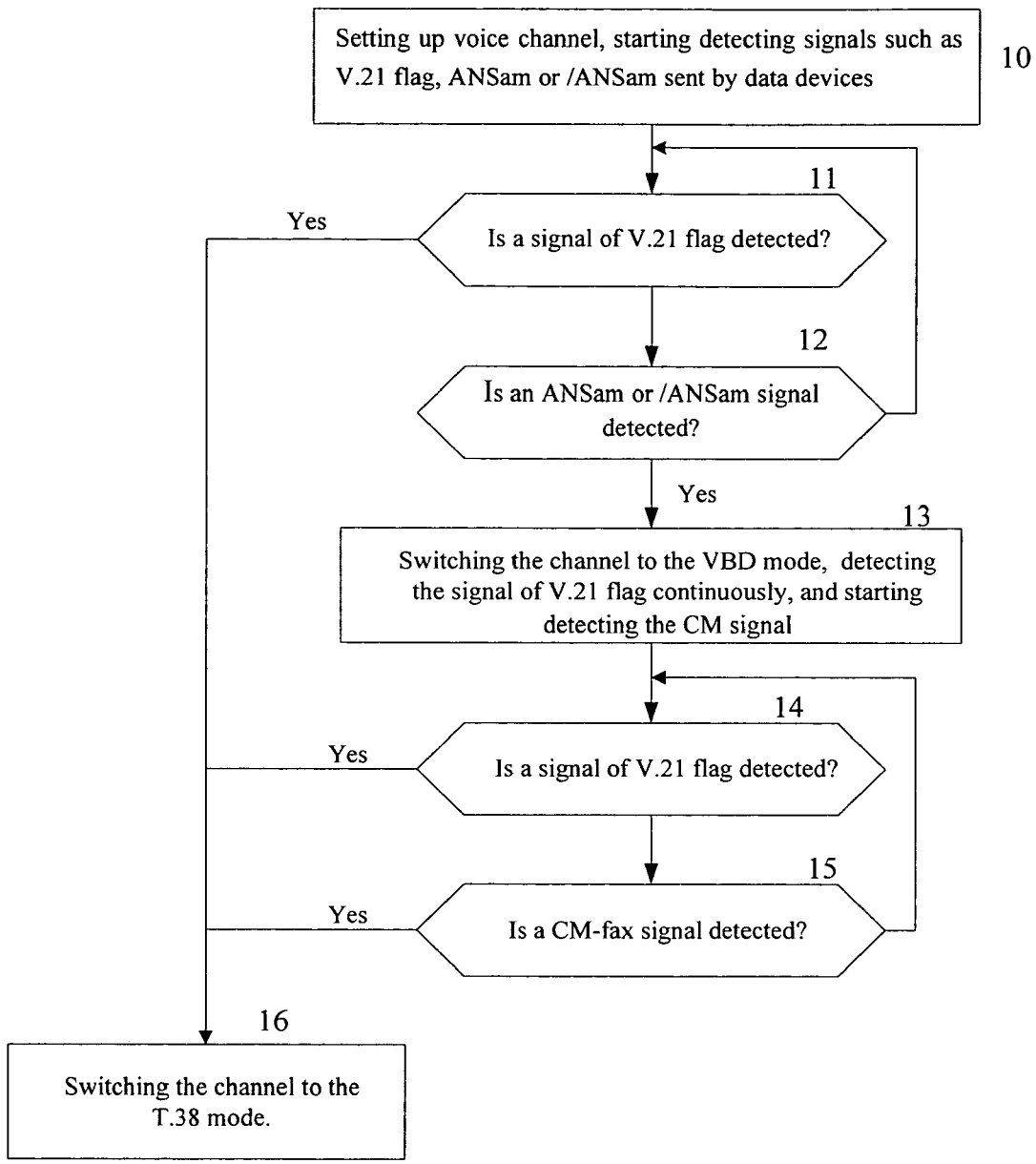
FIG. 1 is the flowchart of the method according to an embodiment of this invention.

With the development of the data services, the number of users accessing the Internet by dialing a number is increasing every day, and the new network services and accessing numbers are emerging endlessly. Even if the prefix of accessing numbers could be set by the gateway whenever necessary, it is hard to cover all of the numbers. Furthermore, if the gateway configuration is altered according to newly emerged prefixes of the accessing numbers, there will be negative impact on the maintenance of the gateway. In addition, in some special occasions requiring high-level security, such as in a bank or a stock market, the Point-to-Point modem service is always adopted between two data terminals, wherein the calling number is a common telephone number without the fixed prefix and the terminal can be used as a common phone if there is no data communication service. Therefore, the approach to set the prefix of the accessing numbers in advance in a gateway is unable to support such applications.

The shortcoming of the solution in the prior art is obvious as well. The VBD mode is vulnerable to network damage. If the status of the network is poor, it is quite possible that a facsimile service become instable, which is completely unacceptable to many telecom operators and users.

The core idea of the present invention is: according to the CM signal sent in the negotiation process between the calling terminal and the called terminal, the type of the media streams passing through the gateway sent by the high speed fax machines or the modems are recognized, that is to say, the type of the media stream on the gateway is identified so that the media stream transition channel on the gateway can be switched to the proper working mode, and the reliability of services transmitted in network communications can be effectively ensured.

The embodiment of the present invention is implemented based on the format characteristics of the CM signals. According to the ITU-T Recommendation V.8bis, after the high speed data devices such as the high speed fax machines and the modems with a speed higher than 33.6 kbps enter the negotiation procedure, first the called terminal sends an ANSam or /ANSam signal to identify its identity of the high speed data equipment; then, after the calling terminal received the ANSam or /ANSam signal sent by called terminal, a CM signal will be sent and the negotiation process will be started.

The call function category field of the CM signal indicates the specific device type. The definitions of such device types identified by Fields b0-b7 in the ITU-T Recommendation V.8 are illustrated by the following table:

| Start | b0 | b1 | b2 | b3 | b4 | b5 | b6 | b7 | Stop | Octet - "callf0" | Reference |
|---|---|---|---|---|---|---|---|---|---|---|---|
| 0 | 1 | 0 | 0 | 0 | | | | | | Tag b0-b3 indicating the call function category | |
| | | | | | | | | | 0 | Indicates a category octet | |

| Start | b0 | b1 | b2 | b3 | b4 | b5 | b6 | b7 | Stop | Octet - "callf0" | Reference |
|---|---|---|---|---|---|---|---|---|---|---|---|
| | | | | | | 0 | 0 | 0 | | To be determined by the ITU-T | |
| | | | | | | 1 | 0 | 0 | | PSTN Multimedia Terminal | ITU-T H.324 |
| | | | | | | 0 | 1 | 0 | | Textphone | Textphone according to ITU-T V.18 |
| | | | | | | 1 | 1 | 0 | | Videotext | ITU-T T.101 |
| | | | | | | 0 | 0 | 1 | | Transmit facsimile from call terminal | ITU-T T.30 |
| | | | | | | 1 | 0 | 1 | | Receive facsimile at call terminal | ITU-T T.30 |
| | | | | | | 0 | 1 | 1 | | Data (unspecified application) | V-series modem Recommendations |
| | | | | | | 1 | 1 | 1 | | Call function as indicated in an extension octet | |
| | | | | | | | | | 1 | Stop bit | |

It can be seen from the table above, if the fields of b5, b6, b7 of the CM signal are '001' or '101', the CM signal is a CM-FAX signal which indicates that the device sent the signal is a high speed fax machine; if the fields of b5, b6, b7 of the CM signal are '011', the equipment sent the signal is an modem.

Therefore, it is easy to recognize whether the data device is a high speed fax machine according to the contents of the corresponding fields of the CM signal.

It is based on the characteristic of the CM signal that the method according to the embodiment of the present invention is implemented, and the corresponding embodiment is an shown in FIG. 1, including the steps of:

Step 10: Detecting the signals passing through the gateway from various data devices.

After the common voice channel of the gateway is set up, the signals from the data devices such as V.21 flag, ANSam, or /ANSam can be detected so as to determine whether the signal is sent by a common fax machine.

Step 11: Judging whether the signal of V.21 flag is detected, if yes, performing step 16, otherwise, performing step 12;

The signal of V.21 flag is sent by a common fax machine, that is to say, if a signal of V.21 flag is first detected, it can be confirmed that the signal is sent from a common fax machine, then it is only needed to perform step 16 to switch the media stream transition channel to the T.38 mode directly.

Step 12: Judging whether an ANSam or /ANSam signal is detected, if yes, performing step 13, otherwise, returning to step 11;

If an ANSam or /ANSam signal is detected first, it can be determined that the signal is from a high speed data device, but it can not be decided at this moment whether the signal is from a high speed fax machine or not from a high speed fax machine, for example, a modem. At this time, the channel can be switched to the VBD mode first to ensure that the ANSam or /ANSam signal is transmitted via the media stream transition channel of the VBD mode, and the distortion caused by the voice coding/decoding when the signal passes through the voice channel is avoided and the transmission reliability of the high speed data service will not be affected.

Step 13: Switching the media stream transition channel to the VBD mode, and further detecting the signals, performing step 14 to exactly confirm the type of the data device that sends the signals so that the media stream transition channel can be expediently switched to the corresponding working mode.

That is to say, the media stream transition channel in the VBD mode needs to keep on detecting a signal of V.21 flag, and starts to detect a CM signal to decide how to switch the working mode of the media stream transition channel in the next step.

Step 14: Judging whether a signal of V.21 flag is detected, if yes, performing step 16, otherwise, performing step 15;

If a signal of V.21 flag is detected, it means that the calling terminal does not support the high speed data services, and the called terminal is a high speed fax machine, therefore, step 16 is performed and the channel is switched to the T.38 mode to ensure the normal transmission of the facsimile services.

Step 15: Judging whether a CM-FAX signal is detected, if yes, performing step 16, otherwise, performing step 14;

The method for judging whether a CM-FAX signal is detected is as described above, that is, judging according to the value of the call function category field of the CM signal.

If a CM-MODEM signal is detected, it means that the calling terminal is a modem. At this moment, the gateway needs not make any processing because the channel is already working in the VBD mode. Therefore, in this step, it is only necessary to detect whether a CM-FAX signal is existing without concerning about the CM-MODEM signal.

If a CM-FAX signal is detected, it means that the calling terminal is a high speed fax machine, and at this moment, it is necessary to perform step 16 to switch the channel to the T.38 mode.

Step 15 is the key step of the embodiment of the present invention, and it is in step 15 that the exact judgment is made on whether the data device is a modem or a high speed fax machine so that the media stream transition channel on the gateway can be switched to the corresponding working mode exactly.

Step 16: Switching the media stream transition channel to the T.38 mode.

Figure 2:
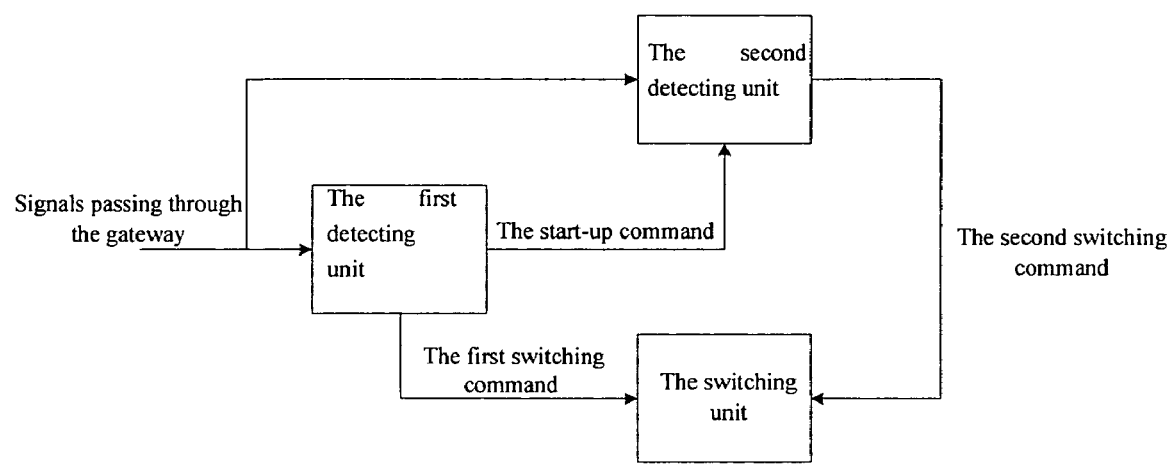
FIG. 2 is the schematic diagram illustrating the device for working mode switching of the media stream transition channel on a gateway.

FIG. 2 is a schematic diagram of the device for working mode switching of the media stream transition channel on a gateway, which includes a first detecting unit, a second detecting unit and a switching unit, wherein the switching unit sets the default working mode of the channel as a voice channel.

The first detecting unit detects the signal passing through the gateway, if a signal of V.21 flag is detected, the first switching command will be issued to the switching unit to switch the channel to the T.38 mode; and if an ANSam or /ANSam signals is detected, the second switching command will be issued to the switching unit to switch the channel to the VBD mode and the start-up command will be issued to the second detecting unit to instruct the second detecting unit to start detecting the signals passing through the gateway.

The second detecting unit detects the signals passing through the gateway, if a CM-FAX signal is detected, the first switching command will be issued to the switching unit to switch the channel to the T.38 mode.

According to the received first switching command, the switching unit switches the channel to the T.38 mode, and according to the second switching command, the channel is switched to the VBD mode.

The foregoing description are only preferred embodiments of the present invention while the protection scope of the present invention is not limited thereof, any change or replacement within the technical range disclosed by the present invention and easily occurring to those skilled in the art should be covered by the protection scope as set up in the claims.

The invention claimed is:

1. A method for working mode switching of a media stream transition channel on a gateway, comprising:
    detecting signals passing through the gateway after a voice channel is set up;
    if a signal sent by a common fax machine is detected, switching the media stream transition channel to a T.38 mode and
    if a signal sent by a high speed data device is detected, conducting a further signal detection, wherein
    if a Call Menu-FAX(CM-PAX) signal is detected, switching the media stream transition channel to the T.38 mode; wherein the call function category fields b5, b6, b7 of the CM FAX signal, are "001" or "101".

2. The method according to claim 1, further comprising:
    if a Call Menu-MODEM(CM-MODEM) signal is detected, switching the media stream transition channel to a Voice-Band Data (VBD) mode.

3. The method according to claim 1, further comprising:
    if the signals sent by the high speed data device is detected, switching the media stream transition channel to the VBD mode.

4. The method according to claim 3, further comprising:
    if a CM-MODEM signal is detected, keeping the media stream transition channel in the VBD mode.

5. The method according to claim 1, wherein the signals sent by a common fax devices comprise V.21 flag signals, which are High Data Link Control (HDLC) frame synchronous signal for 1 s±15%;
    the signals sent by the high speed data device comprise:
    amplitude-modulated answer tone(ANSam) signals☐or amplitude-modulated answer tone with phase reversals (/ANSam) signals.

6. A device for working mode switching of a media stream transition channel on a gateway, comprising a first detecting unit, a second detecting unit and a switching unit, wherein
    the first detecting unit detects signals passing through the gateway;
    if a signal sent by a common fax machine is detected, outputs a first switching command of switching to a T.38 mode to the switching unit; and
    if a signal sent by a high speed data device is detected, outputs a start-up command to the second detecting unit to instruct the second detecting unit to start detecting the signals passing through the gateway;
    the second detecting unit detects the signals passing through the gateway at the receipt of the start-up command, if a Call Menu-FAX(CM-FAX) signal is detected, outputs the first switching command of switching to the T.38 mode to the switching unit; and
    the switching unit implements an appropriate switching operation according to the first switching command.

7. The device according to claim 6, wherein the first detecting unit, when detecting the signals sent by the high speed data device, outputs also the second switching command of switching to a Voice-Band Data (VBD) mode to the switching unit.

8. The device according to claim 6, wherein the second detecting unit, when detecting a Call-Menu-MODEM (CM-MODEM) signal, outputs no switching command to the switching unit.

9. The device according to claim 6, wherein the signals sent by common fax devices comprise V.21 flag signals, which are High Data Link Control (HDLC) frame synchronous signals for 1 s±15%, and the signals sent by the high speed data device comprise
    amplitude-modulated answer tone(ANSam) signals, or amplitude-modulated answer tone with phase reversals (/ANSam) signals.

10. A method for working mode switching of a media stream transition channel on a gateway, comprising:
    detecting signals passing through the gateway after a voice channel is set up;
    if a signal sent by a common fax machine or a signal sent by a high speed data device is detected, switching the media stream transition channel to a Voice-Band Data (VBD) mode;
    upon switching the media stream transition channel to the VBD mode, judging whether a signal sent by a common fax machine is detected
    if a signal sent by the common fax machine is detected, switching the media stream transition channel to a T.38 mode, otherwise, conducting a further signal detection wherein,
    if a Call Menu-FAX(CM-FAX) signal is detected, switching the media stream transition channel to the T.38 mode; and
    if a Call Menu-MODEM(CM-MODEM) signal is detected, maintaining the media stream transition channel in the VBD mode; wherein the call function category fields b5, b6, and b7 of the CM FAX signal, are "001" or "101".

11. The method according to claim 10, wherein the signals sent by the common fax devices comprise V.21 flag signals, which are High Data Link Control (HDLC) frame synchronous signal for 1 s±15%;
    the signals sent by the high speed data device comprise:
    amplitude-modulated answer tone(ANSam) signals☐or amplitude-modulated answer tone with phase reversals (/ANSam) signals.

12. A method for working mode switching of a media stream transition channel on a gateway, comprising:
    detecting signals passing through the gateway after a voice channel is set up;
    if a signal sent by a common fax machine or a signal sent by a high speed data device is detected, switching the media stream transition channel to a Voice-Banded Data (VBD) mode;
    upon switching the media stream transition channel to the VBD mode, conducting a further signal detection, wherein,
    if the signal sent by the common fax machine is detected, switching the media stream transition channel to a T.38 mode;

if a Call Menu-FAX (CM-FAX) signal is detected, switching the media stream transition channel to the T.38 mode; wherein the call function category fields b5, b6, and b7 of the CM-FAX signal are "001" or "101", and if a Call Menu-MODEM (CD-MODEM) signal is detected, maintaining the media stream transition channel in the VBD mode; wherein the call function category fields b5, b6, and b7 of the CM FAX signal, are "001" or "101".

13. The method according to claim 12, wherein the signals sent by the common fax devices comprise V.21 flag signals, which are High Data Link Control (HDLC) frame synchronous signal for 1 s±15% the signals sent by the high speed data device comprise:
amplitude-modulated answer tone (ANSam) signals, or amplitude-modulated answer tone with phase reversals (/ANSam) signals.

\* \* \* \* \*

UNITED STATES PATENT AND TRADEMARK OFFICE
CERTIFICATE OF CORRECTION

| | | |
|---|---|---|
| PATENT NO. | : 7,466,702 B2 | Page 1 of 1 |
| APPLICATION NO. | : 11/518760 | |
| DATED | : December 16, 2008 | |
| INVENTOR(S) | : Tong Jin | |

It is certified that error appears in the above-identified patent and that said Letters Patent is hereby corrected as shown below:

On the front page, last sentence of the Abstract, which reads "The present invention can quickly, implement the working mode" should read --The present invention can quickly implement the working mode--

In column 7, line 29, of claim 1, which reads "b7 of the CM FAX signal, are "001" or "101"." should read --b7 of the CM-FAX signal, are "001" or "101".--

In column 7, line 46, of claim 5, which reads "amplitude-modulated answer tone(ANSam) signals☐or" should read --amplitude-modulated answer tone(ANSam) signals, or--

In column 8, line 30, of claim 10, which reads "fax machine is detected" should read --fax machine is detected,--

In column 8, line 50, of claim 11, which reads "amplitude-modulated answer tone(ANSam) signals☐or" should read --amplitude-modulated answer tone(ANSam) signals, or--

Signed and Sealed this

Seventeenth Day of August, 2010

David J. Kappos
*Director of the United States Patent and Trademark Office*